Feb. 29, 1944.                A. O. GROOMS                    2,342,658
                           INDUCTION MOTOR CONTROL
                            Filed Nov. 30, 1940          4 Sheets-Sheet 1
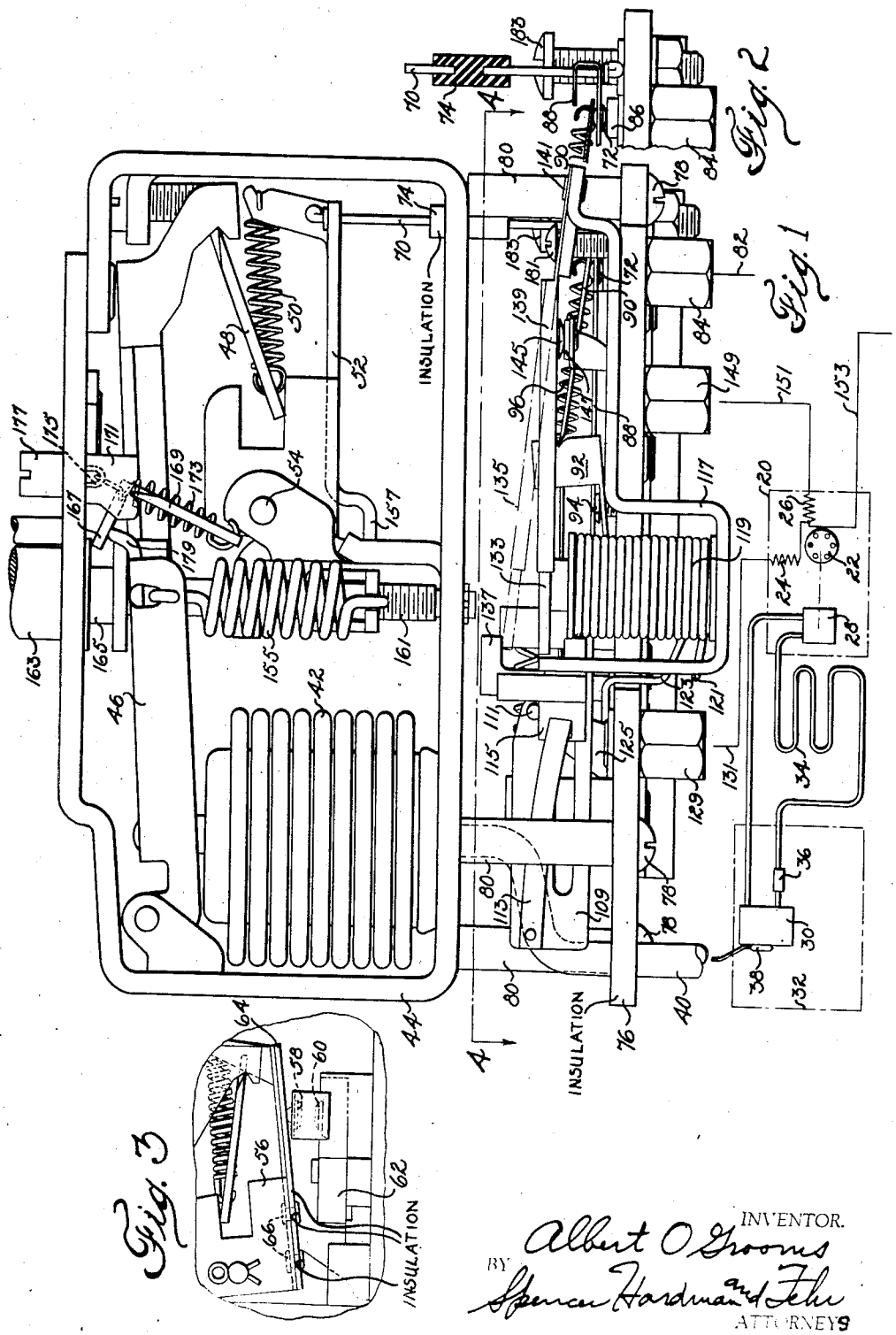
INVENTOR.
Albert O Grooms
BY
Spencer Hardman and Fehr
ATTORNEYS

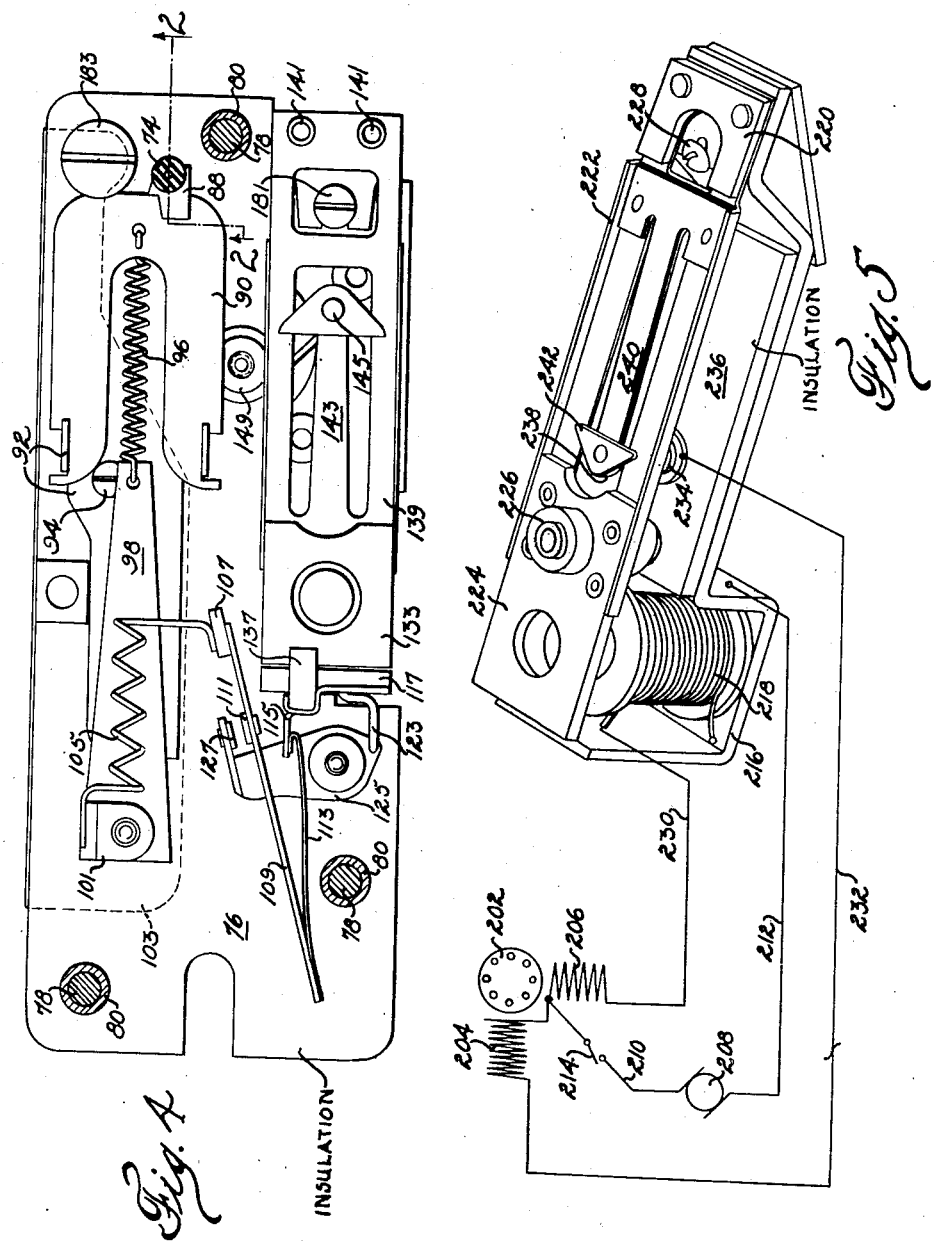

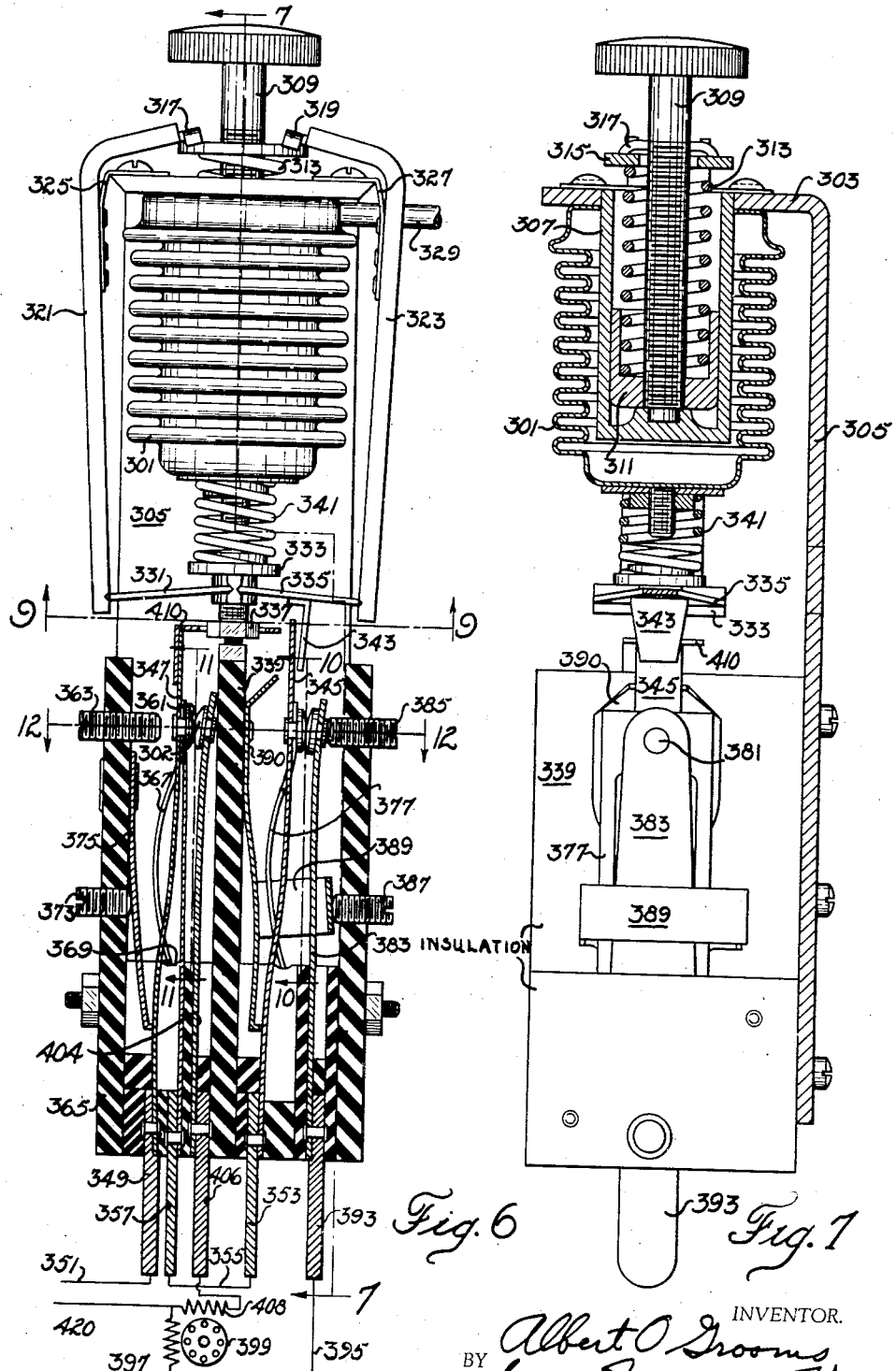

Feb. 29, 1944.  A. O. GROOMS  2,342,658
INDUCTION MOTOR CONTROL
Filed Nov. 30, 1940  4 Sheets-Sheet 4

INVENTOR.
BY Albert O. Grooms
Spencer Hardman and Fehr
ATTORNEYS

Patented Feb. 29, 1944

2,342,658

UNITED STATES PATENT OFFICE 2,342,658

INDUCTION MOTOR CONTROL

Albert O. Grooms, Dayton, Ohio, assignor to General Motors Corporation, Dayton, Ohio, a corporation of Delaware Application November 30, 1940, Serial No. 367,990

6 Claims. (Cl. 172—279)

This invention relates to temperature and motor controls.

It is an object of my invention to provide a temperature and motor control in one unit, which is so constructed that each feature of the control is provided with an independent adjustment.

It is another object of my invention to provide a combined temperature and automatic overload control in which only one contact mechanism is used.

It is another object of my invention to provide a simple relay with a simple timing device for opening the relay.

It is another object of my invention to provide a rivet or fastening member of plastic electrical insulating material.

It is still another object of my invention to provide a control incorporating separate bimetals for operating the starting and overload controls for an electric motor.

Further objects and advantages of the present invention will be apparent from the following description, reference being had to the accompanying drawings, wherein a preferred form of the present invention is clearly shown.

In the drawings:

Fig. 1 is a view of a unitary temperature and motor control together with a diagrammatic refrigerating system;

Fig. 2 is a fragmentary view of a portion located in the rear of Fig. 1, taken on the line 2—2 of Fig. 4;

Fig. 3 is a fragmentary view showing a modification of a portion of Fig. 1;

Fig. 4 is a sectional view taken along the line 4—4 of Fig. 1;

Fig. 5 is a view of a modified form of relay together with an electric motor shown diagrammatically;

Fig. 6 is a view of another type of combined temperature and motor control together with a diagrammatic illustration of an electric motor;

Fig. 7 is a sectional view taken along the line 7—7 of Fig. 6;

Figure 8:
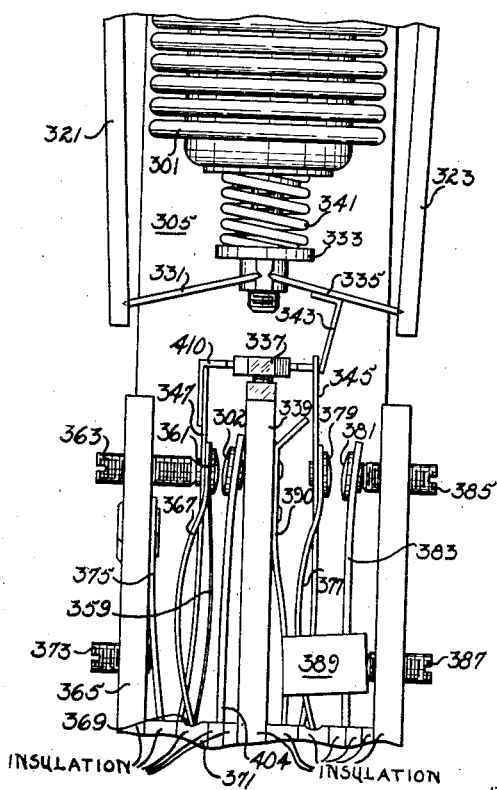
Fig. 8 is a view of a portion of Fig. 6 showing the switch in the open circuit position.
Figure 10:
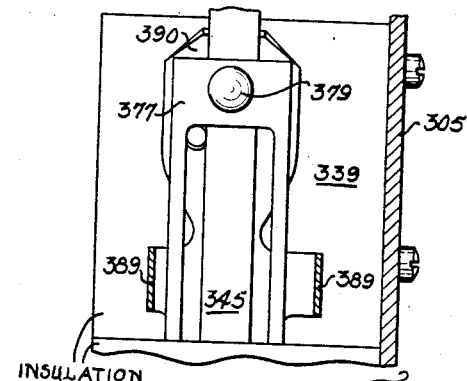
Fig. 10 is a sectional view taken along the line 10—10 of Fig. 6.
Figure 11:
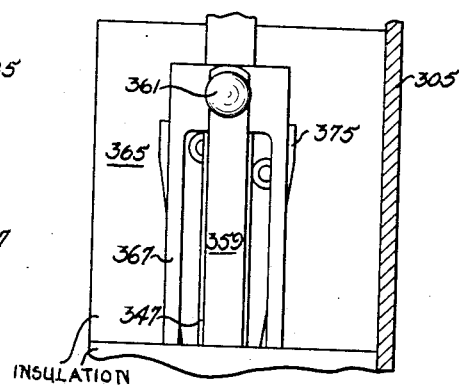
Fig. 11 is a sectional view taken along the line 11—11 of Fig. 6.
Figure 9:
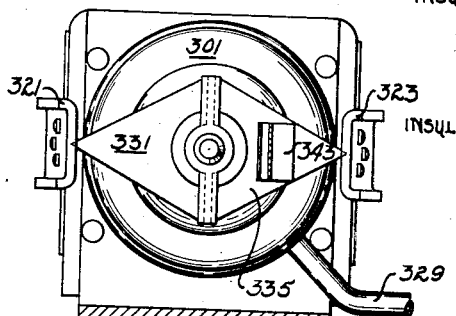
Fig. 9 is a sectional view taken along the lines 9—9 of Fig. 6.
Figure 12:
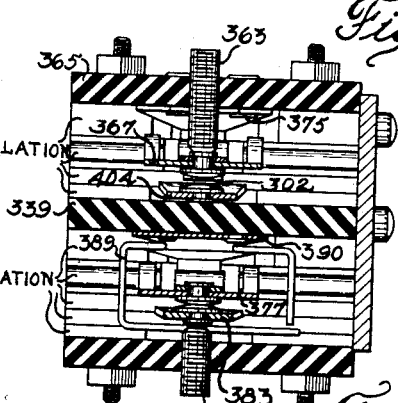
Fig. 12 is a sectional view taken along the line 12—12 of Fig. 6.

Briefly, I have shown a unitary control for a refrigerator including an electromagnetic motor starting control, a current-operated bimetal overload control and a pressure-operated snap-acting thermostat control which operates the overload control in order to start and stop the system. In one modified form a plastic rivet of electrical insulating material is used to prevent arcing where the rivet is near other metal parts. In still another modification an electromagnetic relay is provided with a bimetal contact arm which becomes heated when the relay is energized to open the relay so as to prevent the relay from being energized too long under certain conditions. In still another modified form both the motor starting and overload controls are of the bimetal type and these are also operated by a pressure-operated means to normally start and stop the system.

Referring now to the drawings and more particularly to Figs. 1, 2 and 4, there is shown a refrigerating system including a sealed motor-compressor unit 20 including a driving motor 22 having a main winding 24 and starting winding 26 for operating the compressor 28. The compressor 28 withdraws evaporated refrigerant from the evaporating means 30 located in the compartment 32 to be cooled. This evaporated refrigerant is then compressed and forwarded to the condenser 34 where it is liquefied and returned to the evaporator under a suitable control such as a restrictor 36. In order to properly control the operation of the refrigerating system, a thermostat is normally provided.

In this system, the thermostat includes a thermostat bulb 38 mounted in heat exchange relation with the evaporating means 30 and connected by tubing 40 to a bellows 42 which is mounted in the metal frame 44. This bellows 42 operates a primary lever 46 which in turn is connected to a toggle mechanism including a secondary lever 48, a toggle spring 50 and a third lever 52 which is pivoted upon the pin 54.

In the past it has been customary for such a third lever 52 to control its own set of contacts as shown in Fig. 3. In Fig. 3 this third lever, designated by the reference character 56, operates a movable contact 58 cooperating with a stationary contact 60. Where direct current is used it is desirable to snuff out the arc between the contacts 58 and 60 by the use of a permanent magnet 62. Since the third lever 56 is adjacent to contact 58 it is desirable to insulate this lever by means of the insulating strip 64. However, if this strip should be riveted to the lever 56 by ordinary rivets, arcing might take place from the rivets. Therefore I employ novel rivets 66 formed of a plastic electrical insulating material preferably of the thermo-plastic type, such as that known by the name "Polystyrene" or that known by the name "Tenite." The rivets may be made either solid or hollow. The rivet is set cold and riveted substantially in the manner of an ordinary solid metal rivet. The head of the rivet is preferably under-cut on the face which is positioned against the work or piece held to provide space for a flowing of the plastic material when the rivet is being riveted. By the use of such rivets and by the use of the insulating strip 64 arcing between the third lever 56 and the permanent magnet 62 is effectively prevented.

Instead of operating a set of contacts directly by the third lever 52 in Fig. 1 it is proposed by this invention to operate through the link 70, the automatic overload contact 72 shown in Fig. 2, this link 70 includes an insulating section 74 which prevents the operating mechanism from becoming electrically charged. The starting and overload control mechanism is mounted upon a base 76 of electrical insulating material by means of the screws 78 and spacers 80 surrounding the screws. The current from the electrical supply line 82 connects to a stud 84 fastened to the base 76. The upper portion of this stud 84 carries a stationary contact 86 with which the movable overload contact 72 is adapted to make contact. This movable overload contact 72 is mounted upon a leaf spring member 88 having a hooked end which receives the lower end of the link 70. This hooked end also hooks over a toggle lever 90 provided with knife edges which are retained in the notch member 92. This notch member 92, like the leaf spring member 88, is fastened to the upper side of the base 76 at one end and is sprung upwardly away from the base at the end provided with the notches so that the location of the notches may be adjusted by the adjusting screw 94.

The toggle lever 90 is connected by a tension toggle spring 96 to the overload bimetal 98 which is anchored to the base by the bracket 101. This bracket 101, through a plate 103 provided beneath the plate 76, electrically connects to the contact strip 88. Connected to the bracket 101 is an electric heater 105 which in turn connects to an anchoring post 107. This anchoring post 107 supports a bottom leg of a U-shaped timing device 109 which carries a contact 111 upon the end of its upper leg.

The yoke portion of the bimetal device 109 is connected by the conductor strip 113 to a bracket 115 which is fastened to the iron frame 117 of the electromagnetic starting control. This frame 117 has a portion extending around the electromagnet 119 for carrying the flux and increasing the effectiveness of the electromagnet 119. The electromagnet 119 is connected to the frame 117 by the conductor 121. The electromagnet 119 is also connected by the conductor 123 to a bracket 125 carrying a contact 127 with which the contact 111 is adapted to contact. This bracket 125 is connected to the stud 129 which in turn is connected by the conductor 131 to the main winding 24 of the electric motor 22.

The electromagnet 119 is provided with an armature 133 which assumes a full line position when attracted and the dotted line position designated by the reference character 135 when it is released. A U-shaped stop 137 of felt or other material limits the movement of the armature 133. The armature 133 is carried by a thin member 139 of spring material which is anchored by the rivets 141 to a flange provided on the base 117. This member 139 is provided with a contact-carrying tongue 143 carrying a contact 145 adapted to make contact with the stationary contact 147 mounted upon a bracket which is fastened to the stud 149. This stud 149 is connected by the conductor 151 to the starting winding 26. The common point between the starting winding 26 and the running winding 24 is connected to the other source conductor 153.

With this arrangement, when the temperature at the thermostat bulb 38 is sufficiently low the bellows 42 is collapsed, thereby allowing the primary lever 46 to move downwardly in a clockwise direction under the influence of the range spring 155 to operate the snap-acting mechanism and to raise the third lever 52 and the link 70 as well as the movable overload contact 72. When the thermostat bulb 38 becomes sufficiently warm the primary lever 46 will be moved upwardly by the bellows 42 to operate the snap-acting mechanism in order to lower the third lever 52 until its stop projection 157 engages the adjacent portion of the frame 44. This will also lower the link 70 and allow the movable overload contact to engage the stationary overload contact 86.

This will allow current to flow from the source conductor 82 through the stud 84, the contacts 86 and 72, and the strip 88 to the bracket 101. From the bracket 101 the current traverses the heater element 105, the bimetal 109, the conductor strip 113, the bracket 115, the frame member 117, the electromagnet 119, the conductor 123, the stud 129 and the conductor 131 to the main winding 24 which connects to the other source conductor 153. This causes the attraction of the armature 133, causing the closing of the starting contacts 145 and 147, allowing current to flow from the frame 117 through the armature support 139, the contact arm 143, the contacts 145 and 147, the stud 149 and the conductor 151 to the starting winding 26 which also connects to the other source conductor 153.

Under normal voltage conditions, due to the reduction of current flow through the main winding 24, the electromagnet 119 will release the armature 133 when the motor approaches a normal running speed to open the starting contacts 145 and 147 to deenergize the starting winding 26. However, if the electromagnet 119 should fail to release the armature 133 at the proper time due to unusual voltage conditions, the lower leg of the bimetal timer 109 will become heated sufficiently to cause the bimetal to bend and to close the contacts 111 and 127 in order to shunt the electromagnet 119 and thus allow the armature 133 to be released and to deenergize the starting winding 26. Should there be an excessive current flow through the heater 105 the bimetal 98 will be heated to operate the toggle lever 90 which will raise the hooked end of the contact strip 88 to separate the contacts 72 and 86 to stop the operation of the system.

The switch 44 is provided with a temperature adjusting mechanism including an adjusting screw 161 which adjusts the tension of the range spring 155. This screw 161 may be rotated by reciprocable knob member 163 provided with a groove 165 engaging a bell crank extension 167 of a toggle lever 169 having knife edges received in notches provided in an anchoring member 171. The toggle lever 169 is connected by a tension toggle spring 173 with an adjustable spring anchorage 175 which may be adjusted by the threaded member 177. When the knob member 163 is pushed inwardly the toggle lever 169 will be pushed across the dead-center of the toggle spring 171 to cause the lever 169 to turn about 60 degrees. This will cause the bell crank end of the lever to engage the projecting portion 179 of the primary lever 46 and push the primary lever 46 downwardly so that it will operate the snap-acting mechanism to open the motor circuit. The bell crank extension upon the release of the knob member 163 will continue to be held against the projection 179 by toggle spring 173 which interposes a load upon the bellows 42 in addition to that provided by the range spring 155. This will provide a single cycle having a temperature sufficiently high for defrosting the evaporator 30.

It will be understood that the bellows 42 and its operating mechanism can be adjusted independently of the remainder of the motor control mechanism through the knob 163, while the operation of the electromagnet may be controlled independently by the adjusting screw 181 which adjusts the angle of the anchorage of the armature supporting member 139. The overload control may be also adjusted independently by the set screw 94 which adjusts the location of the knife edge support 92 and may be further adjusted by the set screw 189 which limits the opening movement of the toggle lever 90.

In Fig. 5 the motor starting control system is simplified by combining the timer 109 with the contact arm 143. In Fig. 5 there is shown a motor 202 provided with a starting winding 204 and a running winding 206. The motor receives its energy from a source 208, providing source conductors 210 and 212. The operation of the motor 202 generally may be controlled by one or more switches 214, such as the thermal overload and the temperature-responsive bellows-operated control for the overload, such as is shown in Figs. 1, 2 and 4. The source conductor 212 connects to the frame 216 of soft iron. This frame extends to an electromagnet 218 and provides an adjustable anchorage 220 at its opposite end for the spring hinge member 222 which connects to the armature 224. Stop members 226 of felt are provided above and below the armature 224 for limiting its movement. The angularity of the anchorage 220 for the spring member 222 is adjusted by the adjusting screw 228 in order to adjust the release of the armature by the electromagnet 218.

The electromagnet 218 has one end connected to the base 216 and the other end connected by the conductor 230 to one end of the main winding 206. The other end of the starting winding 204 is connected by the conductor 232 to a stationary insulated contact 234 provided upon an insulating member 236 resting upon the base 216. This contact 234 is adapted to be contacted, when the armature 224 is attracted, by a movable contact 238 provided upon the end of a contact arm 240. This contact arm 240 differs from the contact arm 143 principally in that it is formed of a separate piece of bimetal which is fastened on top of the spring member 222 instead of being an integral part of the spring member 222. This bimetal arm 240 may be made of such a size that when the starting winding 204 has been energized a sufficient length of time, the heating effect of the current flowing through it will cause it to curl away from the contact 234 to separate the contacts 234 and 238 to deenergize the starting winding regardless of the energization of the electromagnet 218.

I find, however, that the contact arm 240 will also operate to separate the contacts 234 and 238 when it curls toward the contact 234 when heated by the current. This occurs by reason of the fact that this contact arm in curling downward is held by the stationary contact 234 and the reaction therefrom raises the armature 224 away from the electromagnet 218 to a position where the attraction between the armature 224 and the electromagnet 218 is reduced to such an extent that the armature 224 is released and the contacts 238 and 234 are separated. A stop member 242 is provided at the end of the contact arm 240 to limit its downward movement. Thus, this bimetal timing device operates upon the starting winding current to directly separate the starting winding contacts instead of shunting the electromagnet according to the heating effect of the entire motor current as is done in the first modification. It will be seen that this form, shown in Fig. 5, considerably simplifies the construction and reduces the number of parts.

In Figs. 6 to 12 there is shown another modification much the same in general principles as the first two modifications. In this control there is provided a bellows 301 fastened to a flange 303 provided upon a frame member 305. The bellows 301 is provided with a capillary tube 329 which extends to the evaporator or other point to which the bellows is to be responsive. The bellows and capillary tube are preferably charged with a volatile liquid and the entire system is sealed by the sealing of the end of the capillary tube.

A thimble 307 extends within the bellows 301 and is fastened to and sealed to the base of the bellows 301. This thimble supports an adjusting screw 309 carrying a spring retainer 311 for adjusting the tension of the compression spring 313 which has its upper end bearing against an upper spring retainer 315. This spring retainer 315 bears against the ends 317 and 319 of the bell crank levers 321 and 323 which are pivoted to the flange 303 of the base 305 by the leaf spring hinges 325 and 327. The lower ends of each of the toggle levers are provided with toggle blades. The blade 331 has a pointed end which is pivoted to the end of the lever 321 and its opposite end is pivotally mounted in the operating member 333. The toggle blade 335 likewise has a pointed end which is pivotally mounted at the extreme end of the lever 323, while its other end is pivotally mounted in notches provided upon the operating member 333. The operating member 333 engages an adjustable stop screw 337 at its lower end which is supported by the insulating plate 339. It should be noted that, in its lowermost position, the operating member 333 does not carry the toggle blades 331 and 335 across their dead-center position. The operating member 333 is connected to the movable end of the bellows by compression spring 341 through which the operation of the operating member takes place.

The mechanism so far described has no contact mechanism in itself, but the starting and overload contact mechanism is operated to open the motor circuit through an operating arm 343 fastened to the bottom of the blade 335 so that when the blade is moved to the position shown in Fig. 8 it will open both the starting and the overload contacts.

The starting and overload control includes an overload bimetal member 345 and a starting bimetal member 347. The starting bimetal member 347 is fastened to the contact pin 349 (Fig. 6) which in turn is connected to the source conductor 351. The overload bimental member 345 is connected to a conductor 353 which in turn is connected through a conductor 355 to a conductor 357 which in turn connects to a flexible conductor 359 (Fig. 8) connecting to the end of the bimetal 347, which is provided with a movable contact 361. The opening movement of this movable contact 361 is adjusted by a set screw 363 supported by the insulating member 365. Fastened to the end of the bimetal strip 347 and to the conductor strip 359 by the contact 361, is a U-shaped spring metal member 367 which has the ends of its legs extending into the notches 369 provided in the insulating spacer member 371. The bimetal strip 347 is kept under tension so as to slightly bow the legs of the spring member 367. This provides a snap-acting control for the operation of the bimetal 347. The bimetal 347 is further adjusted by the adjusting screw 373 which extends through the member 365 and bears against the strip 375 which in turn has a hooked end bearing against the bimetal 347 adjacent its anchoring point provided by the contact pin 349. This strip 375 will tend to impose a slight load upon the bimetal in one direction.

The overload bimetal 345 is likewise provided with a U-shaped spring metal member 377 which is fastened to it by its contact 379 (Fig. 8). This contact 379 is adapted to make engagement with a normally stationary contact 381 provided at the end of a spring metal member 383 which is biased to rest against the stop screw 385 to adjust the location of the contact 381 in order to adjust the operation of the overload bimetal 345. In addition, the set screw 387, through the yoke 389 which connects to the spring member 390, also tends to deflect the bimetal 345 through the hooked end which engages the bimetal 345 adjacent the conductor member 353. The spring member 383, which carries the stationary contact 381 at one end, connects to a conductor pin 393 at its other end which in turn is connected by the conductor 395 to the main winding 397 of the electric motor 399. The contact 361 is adapted to make engagement with a stationary contact 302 provided upon the end of a spring member 404 which is normally biased to rest against the insulating member 339. This spring member 404 is anchored to the conductor pin 406 which in turn connects to the starting winding 408 of the motor 399.

As shown in Fig. 8, when the capillary tube is cooled, the bellows 301 is in a collapsed condition. The lever arms 321 and 323 move toward each other to raise the operating member 333 and to turn the toggle blade 335 in a clockwise direction to cause the arm 343 to engage the end of the bimetal 345 to separate the overload contacts 379 and 381. A yoke 410 extends from the end of the bimetal 345 to the end of the bimetal 347 so that the opening of the contacts 379 and 381 will also open the contacts 361 and 302 in order to deenergize the starting winding.

When the capillary tube 329 becomes warm the bellows 301 will expand to move the spring 341 and the operating pin 333 downwardly against its stop 337 to move the arm 343 in a counter-clockwise direction away from the end of the overload bimetal 345 to the position shown in Fig. 6. If the bimetals 345 and 347 are cool, as they would be expected to be under normal conditions, current will flow from the source conductor 351 through the connector pin 349, the bimetal 347, the contacts 361 and 302, and the strip 404 to the connector pin 406 which in turn connects to the starting winding 408. The main winding current also flows through a portion of this circuit, namely the conductor 351, the connector pin 349 and the bimetal 347. However, from the contact 361, the main winding current extends through the conductor strip 359 through the conductors 357, 355 and 353 to the anchoring end of the bimetal 345 which carries the current to the contacts 379 and 381 from which point the main winding current flows through the spring member 383 to the connector pin 393 which in turn is connected by the conductor 395 to the main winding 397, which joins with the other end of the starting winding 408 to connect to the other source conductor 420.

After sufficient current has passed through the bimetal 347 to allow the motor 399 to start and to substantially attain full speed, the bimetal 347 will become heated sufficiently to overcome the opposition of the bowed legs of the U-shaped spring member 367 to snap the contact 361 away from the contact 302 to a position against the set screw 363 in order to open the starting winding circuit and to deenergize the starting winding 408. For the remainder of the cycle the motor 399 will operate upon the main winding 397 alone. Should there be any overload at any time, the current which passes through the bimetal 345 will heat the bimetal 345 sufficiently to cause it to snap the contact 379 away from the contact 381 to open the main winding circuit to deenergize the main winding 397. In this opening movement the end of the bimetal 345 will engage the yoke 410 to move the starting winding contact 361 to open circuit position against the set screw 363. When the capillary tube 329 has been cooled sufficiently the bellows will collapse and move the toggle blades to the position shown in Fig. 8, thereby opening the main winding contacts 379 and 381 as well as the starting winding contacts 361 and 302 through the medium of the arm 343 and the yoke 410.

The differential of the main winding contacts is adjusted by the set screw 385 while the differential of the starting winding contacts is adjusted by the set screw 363. The operating range of the main winding contacts is adjusted by the set screw 387 while the operating range of the starting winding contacts is adjusted by the set screw 373. Since the screw 309 separately adjusts the operation under the control of the bellows 301, separate adjustments are thereby provided for each function of the control.

While the form of embodiment of the invention as herein disclosed, constitutes a preferred form, it is to be understood that other forms might be adopted, all coming within the scope of the claims which follow.

What is claimed is as follows:

1. In combination, an electric motor having phase and main windings, a current responsive starting control for controlling the energization of the phase winding, overload control contacts including a single movable contact and a fixed contact for controlling the energization of at least the running winding, overload control means for operating to open and closed positions said movable contact, and pressure-operated means for operating said movable contact, a first snap-acting means for controlling the operation of said movable contact, and a second snap-acting means for controlling the operation of the pressure-operated means.

2. A control including a pressure operable diaphragm means, a control device to be operated from one position to another and return, a toggle means constituting at all times the major control of the movement of the diaphragm means, means for preventing the movement of the toggle means across dead center position, and means operated by the diaphragm means for operating said control device from one position to another.

3. A control including a pressure operable diaphragm means, a control device to be operated from one position to another and return, a toggle means constituting at all times the major control of the movement of the diaphragm means, means for preventing the movement of the toggle means across dead center position, and a lost motion means operated by said diaphragm means for operating said control device.

4. A control including a pressure operated diaphragm means, a set of rigid toggle members constituting the major force opposing the movement of the diaphragm means, spring means exerting a force upon the toggle members, means for limiting the movement of the toggle members to one side of the dead center position and for stopping the movement a short distance prior to reaching the actual dead center position, and a control device operated by the movement of the diaphragm means.

5. In combination, an electric motor having main and phase windings, a starting control for controlling the energization of the phase winding, an actuating element for said starting control, a self-resetting overload protector including means for deenergizing at least the running winding, means including a mechanical transmitting element for mechanically opening said starting control upon the opening of the overload protector, a second actuating element responsive at least to the current flowing through the running winding for operating said overload protector, and separate adjusting means for said protector and said starting control.

6. In combination, an electric motor having main and phase windings, a starting control for controlling the energization of the phase winding, an actuating element for said starting control, a self-resetting overload protector including means for deenergizing at least the running winding, means including a mechanical transmitting element for mechanically opening said starting control upon the opening of the overload protector, a second actuating element responsive at least to the current flowing through the running winding for operating said overload protector, separate adjusting means for said protector and said starting control, and a fluid motor for mechanically moving both said overload protector and said starting control to open circuit position.

ALBERT O. GROOMS.